(12) United States Patent
Teragawa

(10) Patent No.: US 8,045,094 B2
(45) Date of Patent: Oct. 25, 2011

(54) BACKLIGHT DEVICE, DISPLAY DEVICE, AND TELEVISION RECEIVER

(75) Inventor: Daisuke Teragawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 199 days.

(21) Appl. No.: 12/521,241

(22) PCT Filed: Jul. 23, 2007

(86) PCT No.: PCT/JP2007/064456
§ 371 (c)(1),
(2), (4) Date: Jul. 17, 2009

(87) PCT Pub. No.: WO2008/084569
PCT Pub. Date: Jul. 17, 2008

(65) Prior Publication Data
US 2010/0014025 A1        Jan. 21, 2010

(30) Foreign Application Priority Data
Dec. 26, 2006   (JP) .................................. 2006-348713

(51) Int. Cl.
*G02F 1/1335* (2006.01)
(52) U.S. Cl. ........................................................ 349/64
(58) Field of Classification Search ...................... 349/64
See application file for complete search history.

(56) References Cited

U.S. PATENT DOCUMENTS

| 7,510,314 B2 * | 3/2009 | Arai et al. ..................... 362/609 |
| 2005/0099604 A1 | 5/2005 | Mizumaki et al. |
| 2007/0132909 A1 * | 6/2007 | Oohira ............................ 349/58 |

FOREIGN PATENT DOCUMENTS

| JP | 11-52372 A | 2/1999 |
| JP | 11-337942 A | 12/1999 |
| JP | 2001-76527 A | 3/2001 |

* cited by examiner

*Primary Examiner* — Richard Kim
(74) *Attorney, Agent, or Firm* — Birch, Stewart, Kolasch & Birch, LLP

(57) ABSTRACT

A backlight device capable of preventing or reducing, even when an optical sheet bends, occurrence of luminance non-uniformity and/or shades due to the bend. The backlight device 1 controls the properties of light emitted by a light source 12 using two upper and lower diffusion sheets 16, 20 and a lens sheet 18 placed between the diffusion sheets and illuminates the back side of a display panel with the light, in which a space 24 for expansion is provided between the lens sheet 18 and the upper diffusion sheet 20, the space for expansion accommodating a bend of the lens sheet 18 which is caused by expansion due to heat from the light source 12.

6 Claims, 11 Drawing Sheets

Sectional view of A-A line

BACKLIGHT DEVICE, DISPLAY DEVICE, AND TELEVISION RECEIVER

BACKGROUND OF THE INVENTION

1. Field of the Invention

The present invention relates to a backlight device and a display device and, more particularly, to a backlight device suitably used for a display device having a translucent display panel, and a display device having the backlight device.

2. Description of the Related Art

Some display devices including a non-self-emissive display panel such as a translucent liquid crystal display panel have a backlight device on the back side of the display panel. This backlight device includes a light source such as a fluorescent tube and predetermined kinds of optical sheets which control the properties of light emitted by the light source, and is arranged to illuminate the back side of the display panel with the light whose properties are controlled. The light illuminating the back side of the display panel passes through the display panel, making images displayed visible on the front side of the display panel, i.e., on the screen.

The optical sheets placed between the light source and the display panel is generally a stack of a diffusion sheet, a lens sheet, a prism sheet, and a polarizing reflection sheet.

Some optical sheets are stacks of a plurality of films or sheets having different coefficients of thermal expansion. When the display device is used and such optical sheets are heated by heat from the optical source and other members, a bend and/or a wrinkle may occur due to the difference in the coefficients of thermal expansion of the materials.

In addition, difference between the coefficient of thermal expansion of optical sheets and that of a member supporting the optical sheets may also cause a bend and/or a wrinkle of the optical sheets. In the case of a structure where the optical sheets are supported by the supporting member at the edge portion, when the optical sheets and the supporting member are expanded by heat, the vicinity of the region supported by the supporting member of the optical sheets is pulled due to the difference in the coefficients of thermal expansion, causing a bend and/or a wrinkle.

If a bend and/or a wrinkle occur in the optical sheets, the bend and/or the wrinkle may result in luminance nonuniformity and/or shades on the front side of the display panel. In particular, if the optical sheets bend repeatedly and thus undulates, or if a bend occurs in an optical sheet having directional optical properties such as a lens sheet, the luminance nonuniformity and/or shades on the screen are easy to visually perceive, which may degrade the display quality of the display device. Accordingly, it is preferable to keep the optical sheets free from a bend or a wrinkle.

Some conventional backlight devices are capable of reducing degradation of the display quality caused by a bend and/or a wrinkle of optical sheets. For example, a configuration is used in which a through hole is formed on the edge portion of optical sheets and a boss or other component is freely fitted into the through hole (see Japanese Patent Application Unexamined Publication No. Hei11-337942). In another configuration, a positioning piece is provided on the edge portion of optical sheets and is engaged into a concave portion provided in a chassis or a frame (see Japanese Patent Application Unexamined Publication No. 2001-76527). In yet another configuration, such a through hole or a positioning piece is used to support optical sheets at about the middle of the side which is located on the top in terms of direction of gravitational force when the display device is in use (see Japanese Patent Application Unexamined Publication No. 2005-158707). The above configurations allow the edge portion of the optical sheets to freely alter the shape by heat, thereby reducing occurrence of a bend due to thermal expansion of the optical sheets to some extent.

However, even with a backlight device having such a support configuration, there are some cases where a bend or a wrinkle cannot be prevented perfectly, depending on the conditions of thermal expansion of the optical sheets.

For example, if the temperature of the edge portion of the optical sheets differs from that of the center portion, the amount of thermal expansion may be nonuniform in accordance with the temperature distribution, which may result in nonuniform bends and/or wrinkles. If the bending states are different as described above between the edge portion and the center portion of the optical sheets, it is difficult to remove the bends and/or wrinkles even if the edge portion of the optical sheets can freely alter its shape.

As described above, various factors such as the coefficient of thermal expansion and temperature distribution affect the optical sheets in combination and cause various types of bends. Consequently, it is very difficult to entirely remove bends and wrinkles of the optical sheets.

SUMMARY OF THE INVENTION

In order to overcome the problems described above, preferred embodiments of the present invention provide a backlight device which is capable of preventing or reducing, even when an optical sheet bends, occurrence of luminance nonuniformity and/or shades due to the bend, and a display device including the backlight device.

To achieve the objects and in accordance with the purpose of the present invention, a backlight device includes a light source arranged to emit light and a plurality of stacked optical sheets arranged to control the properties of the light emitted by the light source, and is arranged to illuminate a back side of a display panel with the light whose properties are controlled, in which the optical sheets have a space for expansion therebetween, which is arranged to accommodate a bend of the optical sheets which is caused by expansion of the optical sheets due to heat from the light source.

It is preferable if one of the optical sheets which are opposed to each other having the space for expansion therebetween has directional optical properties.

It is also preferable if the back light device further includes a spacer which is placed between the optical sheets entirely or partly on an edge portion of the optical sheets.

The optical sheets include a diffusion plate, a diffusion sheet, and a lens sheet.

Such a backlight device can be used in a display device.

In the present invention, because the optical sheets are provided with the space for expansion which is arranged to accommodate a bend of the optical sheets which is caused by expansion of the optical sheets due to heat from the light source, the optical sheets tend to bend only toward the side where the space for expansion is provided when the optical sheets expand due to heat from the light source or other members. By intentionally providing a direction toward which the optical sheets tend to bend as described above, it is possible to inhibit the optical sheets from undulating due to thermal expansion. Accordingly, any bend of the optical sheets can be prevented from resulting in luminance nonuniformity and/or shades which are easy to visually perceive on the screen of the display panel.

DETAILED DESCRIPTION OF THE PREFERRED EMBODIMENTS

Figure 1:
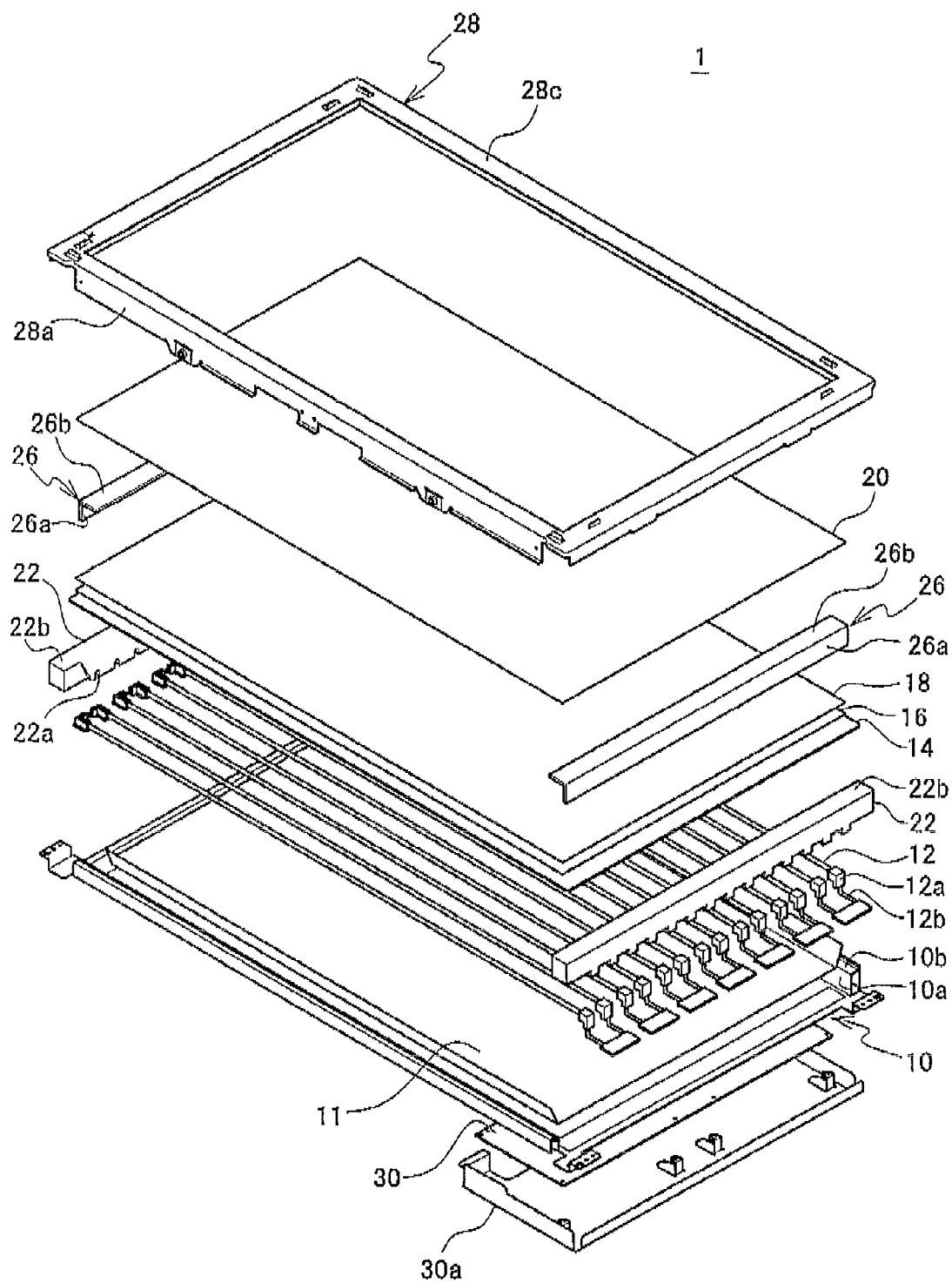
FIG. 1 is an exploded perspective view showing a backlight device according to a preferred embodiment of the present invention.

A detailed description of preferred embodiments of the present invention will now be given with reference to the accompanying drawings. First, a description on the overall configuration of a backlight device 1 according to a preferred embodiment of the present invention is provided. FIG. 1 is an exploded perspective view showing the backlight device 1 according to the preferred embodiment of the present invention. In the following description, unless otherwise noted, the side of the backlight device 1 from which light is emitted, i.e., the side facing the top of FIG. 1, is referred to as the front side, while the opposite side of the backlight device 1, i.e., the aide facing the bottom of FIG. 1, is referred to as the back side.

In the backlight device 1 according to the preferred embodiment of the present invention, a plurality of light sources 12 in the shape of a straight tube are arranged substantially parallel to each other on the front side of a chassis 10, and a plurality of optical sheets 14, 16, 18, 20 are placed on the front side of the light sources 12.

The chassis 10 (also referred to as a backlight chassis) is a member substantially in the shape of a flat plate. On the opposed longer edges of the chassis 10, side walls 10a are provided which up stand toward the front side. On the front side of the side walls 10a, support surfaces 10b are provided which can support optical sheets (to be described later). On the shorter edges of the chassis 10, light-source holders 12a which are attached to the ends of the light sources 12 are to be locked. The chassis 10 is preferably made of a metal plate by press working.

The light sources 12 are placed on the front side of the chassis 10. As the light sources 12, generally-used light sources such as fluorescent lamps including a cold cathode tube and a hot cathode tube, discharge lamps including a xenon lamp, and LEDs are preferably used. In the preferred embodiment of the present invention, cold cathode tubes in the shape of a straight tube are used as shown in FIG. 1.

On the both ends of each of the cold cathode tubes (the light sources 12), the light-source holders 12a arranged to support the light sources 12 are attached. The light-source holders 12a have functions of protecting connection portions between cables 12b and the light sources 12 and locking the light sources 12 to the chassis 10. The light-source holders 12a are made of a resin having insulating properties.

A reflection sheet 11 is placed between the chassis 10 and the light sources 12. The reflection sheet 11 is arranged to reflect light emitted by the light source 12, and is a sheet-shaped member made of a sheet-shaped expanded PET material (polyethylene terephthalate) for example.

On both of the shorter sides of the chassis 10 on which the light sources 12 are provided, side holders 22, 22 are attached which have functions including supporting optical sheets. The side holders 22, 22 each include an outer shell which is substantially in the shape of a square tube and the back side of which (the side which faces the light sources 12) is opened. On one side of the outer shell, substantially U-shaped notches 22a into which the light sources 12 can be freely fitted are provided, so that the side holders 22, 22 can be attached to the ends of the light sources 12 so as to cover them. On the front side of each of the side holders 22, 22, a support surface capable of supporting an edge portion of optical sheets (a shorter edge portion of optical sheets as for the present preferred embodiment of the present invention). The side holders 22, 22 are preferably made of a resin material, and are each unitarily molded.

On the front side of the side holders 22, the plurality of optical sheets 14, 16, 18, 20 having functions such as adjusting properties of light emitted by the light sources 12 are placed. The optical sheets are sheet-shaped or plate-shaped members, and are arranged to control the properties of light emitted by light sources. The optical sheets are generally a stack of a diffusion sheet, a lens sheet, a polarizing reflection sheet, and a diffusion plate.

The diffusion plate and the diffusion sheet consist for example of a base material made of a transparent resin, in which fine particles which reflect light are mixed. The diffusion plate and the diffusion sheet have functions of making the luminance distribution uniform by diffusing light being transmitted therethrough. Generally, a diffusion plate is thicker than a diffusion sheet. For example, the diffusion plate is about 2 mm in thickness, while the diffusion sheet is about 0.2 mm.

The lens sheet has a layered structure of a base material layer preferably made of polyethylene terephthalate and a layer which has a predetermined cross-sectional shape, has the function of converging light, and is made of an acrylic resin. The lens sheet has the function of converging light being transmitted therethrough so as to increase the luminance.

The polarizing reflection sheet is a stack of a layer preferably made of a transparent resin material and a polarizing reflection layer and has the function of transmitting light having a predetermined polarization component and reflecting light having other polarization components.

In the backlight device 1 according to the preferred embodiment of the present invention, the diffusion plate 14, the first diffusion sheet 16, the lens sheet 18, and the second diffusion sheet 20 are stacked. Specifically, the diffusion plate 14 is arranged such that the edge portions of the diffusion plate 14 are placed on the support surface of the chassis 10 and the support surfaces of the side holders 22, and the first diffusion sheet 16 and the lens sheet 18 are stacked thereon (on the front side of the diffusion plate 14). The space provided between the lens sheet 18 and the second diffusion sheet 20 functions as a space 24 for expansion which is arranged to accommodate a bend caused by expansion due to heat of the lens sheet 18.

In order to provide the space 24 for expansion which is arranged to accommodate a bend caused by the expansion due to heat from the light sources 12 or other members, spacers 26 are provided between the lens sheet 18 and the second diffusion sheet 20. In the preferred embodiment of the present invention, the spacer 26 is substantially in the shape of letter L in cross section and in the same length as the shorter sides of the optical sheets 14, 16, 18, 20. An upper plate 26b of each of the spacers 26 is placed on each edge of the shorter sides of the optical sheet (the lens sheet 18 as for the present preferred embodiment), and a side plate 26a extending downward (toward the back side) from the outer edge of each of the upper plates 26b is placed outside the outer side surface of each of the side holders 22 on which optical sheets are placed. The spacer 26 is made of a metal plate by press working, or is made of a synthetic resin material by injection molding, for example.

Because the spacer 26 is in the shape of letter L in cross section, when a frame 28 (to be described later) is attached to the chassis 10 and the optical sheets and other members are held therebetween, the upper plates 26b of the spacers 26 are placed between the optical sheets (the lens sheet 18 and the second diffusion sheet 20 as for the present preferred embodiment), and the side plates 26a of the spacers 26 are held between the frame 28 and the side holders 22. Additionally, in order to secure the spacer 26 to the side holder 22, the chassis 10, and/or the frame 28, a securing portion may be provided.

On the front side of the optical sheets 14, 16, 18, 20, the frame 28 is attached which is a frame-shaped member, and has functions such as securing the optical sheets 14, 16, 18, 20 to the chassis 10. The frame 28 includes a frame portion 28c which is in the shape of a square with an opening and a side wall portion 28a extending from the outer edge of the frame portion 28c toward the chassis 10. The frame 28 is made of a metal plate by press working, or is made of a unitarily molded resin material, for example.

On the back side of the chassis 10, a light source driving circuit board 30 for driving the light sources 12 is provided, and a light source driving circuit board cover 30a is attached covering the light source driving circuit board 30. The light source driving circuit board 30 incorporates electronic/electric circuits which drive the light sources 12. The light source driving circuit board cover 30a is arranged to cover the light source driving circuit board 30 and is made of a conductor such as a metal plate.

Figure 2A:
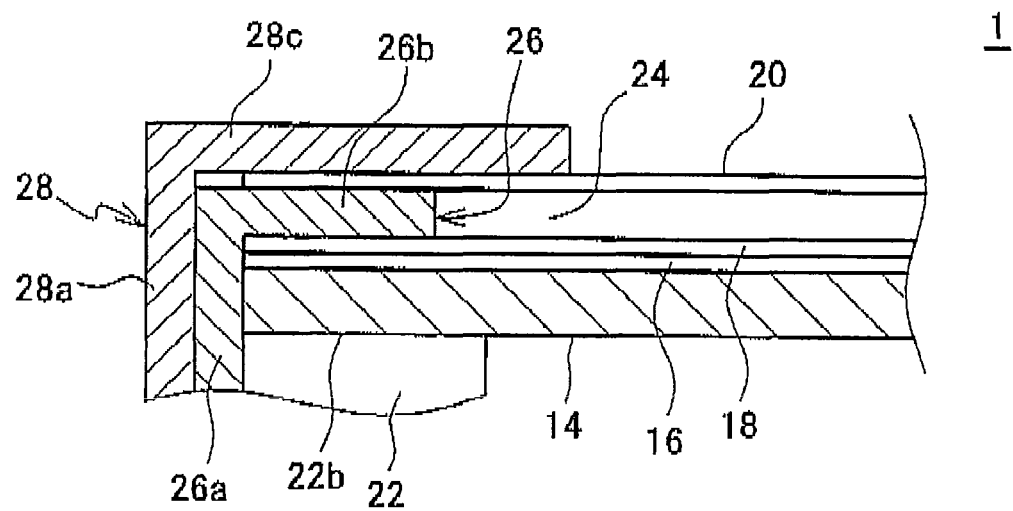
FIGS. 2A and 2B are enlarged sectional views of the vicinity of edge of optical sheets in a state where the backlight device shown in FIG. 1 is assembled.

FIG. 2A is an enlarged sectional view showing the vicinity of edge of the optical sheets 14, 16, 18, 20 in a state where the backlight device 1 is assembled. The first diffusion sheet 16, the lens sheet 13, and the second diffusion sheet 20 are placed over the diffusion plate 14 (on the front side of the diffusion plate 14) which is placed on a support surface 22b of the side holder 22, and the spacer 26 is placed between the lens sheet 18 and the second diffusion sheet 20. The space 24 for expansion is thus provided between the lens sheet 18 and the second diffusion sheet 20. Accordingly, the first diffusion sheet 16 is placed on one surface (the lower surface) of the lens sheet 18, and the space 24 for expansion is provided on the other surface (the upper surface).

When the light sources 12 of the backlight device 1 are driven, the heat from the light sources 12 and the heat from peripheral electric/electronic components such as the light source driving circuit board 30, which supplies power to the light sources 12, increase the temperatures of members such as the optical sheets 14, 16, 18, 20. Accordingly, each member expands in accordance with its temperature and its coefficient of thermal expansion.

Because the first and second diffusion sheets 16, 20 and the lens sheet 18 are thin sheet-shaped members, a bend and/or a wrinkle tend to occur when they are expanded by heat. In addition, the optical sheets 16, 18, 20 differ in properties such as coefficient of thermal expansion and rigidity and thus differ in the state of a bend and/or a wrinkle.

Figure 3A:
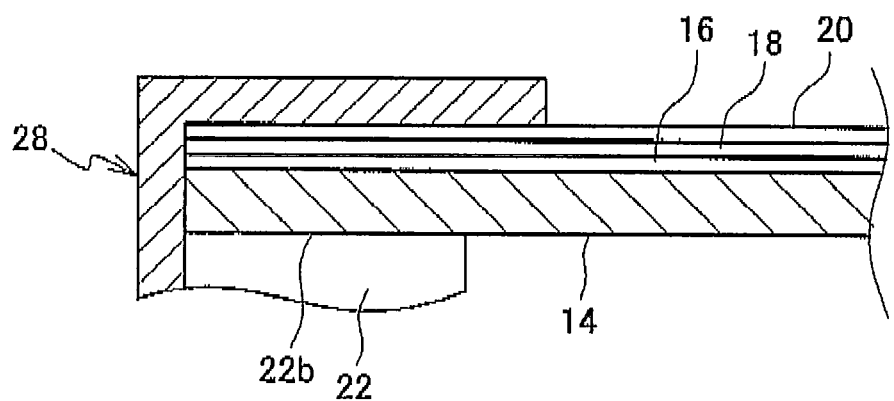
FIGS. 3A and 3B are enlarged sectional views of the vicinity of edge of optical sheets to which a space for expansion is not provided.
Figure 3B:
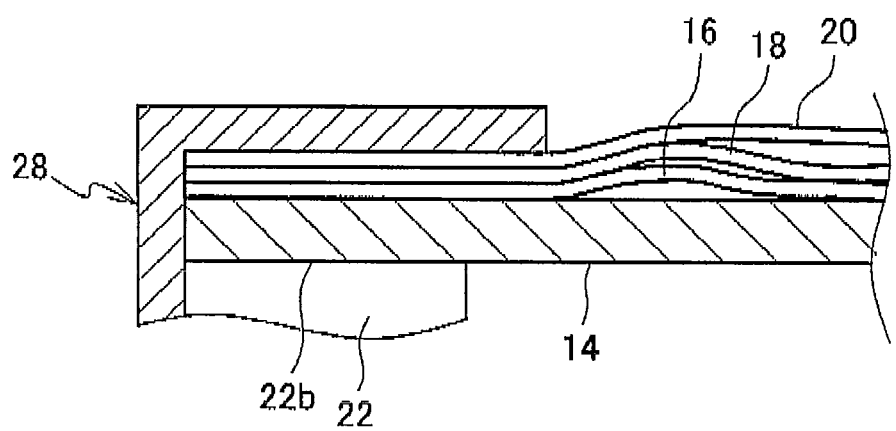

A case where the spacer 26 is not provided between the second diffusion sheet 20 and the lens sheet 18 and thus the space 24 for expansion is not provided is described referring to FIGS. 3A and 3B. FIG. 3A shows that if the space 24 for expansion is not provided between the second diffusion sheet 20 and the lens sheet 18, the lower and the upper surfaces of the lens sheet 18 are entirely in contact with the upper surface of the diffusion sheet 16 and the lower surface of the second diffusion sheet 20, respectively. If each of the optical sheets is expanded by heat in this state, the lens sheet 18 bends upward and downward, i.e., undulates, because the lens sheet 18 is sandwiched between the first and second diffusion sheets 16 and 20 and there is no space for accommodating the thermal expansion. As for the first diffusion sheet 16, even though it can freely bend upward at a portion where the lens sheet 18 bends upward, the diffusion sheet 16 is pressed by the lens sheet 18 at a portion where the lens sheet 18 bends downward and is in contact with the diffusion sheet 16, and thus undulates in accordance with the lens sheet 18. If the optical sheets undulate as described above, luminance nonuniformity and/or shades occur on the screen when a display panel is provided in the front side of the backlight device 1 and an image is displayed thereon, causing significant degradation in display quality.

Figure 2B:
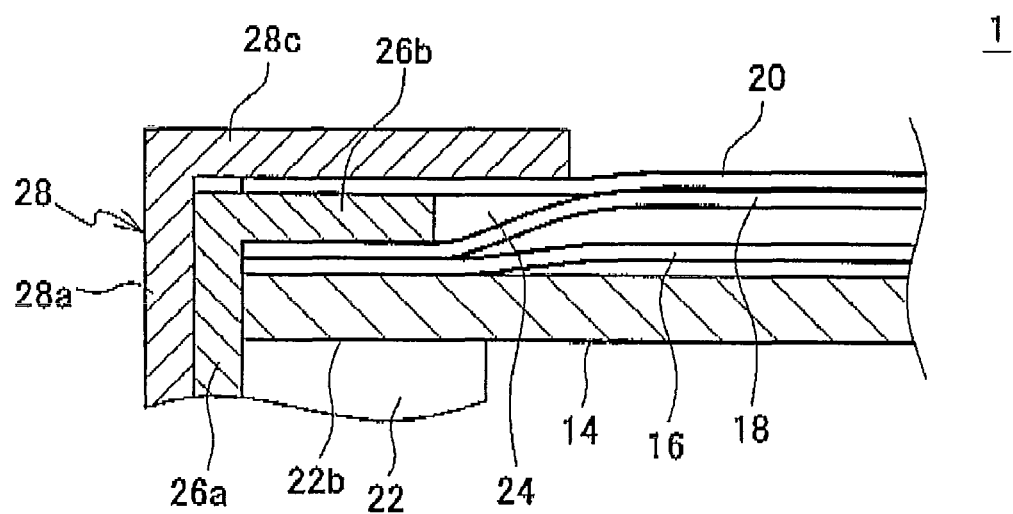

FIG. 2B is an enlarged sectional view showing the optical sheets 14, 16, 18, 20 which are heated by heat from the light sources 12 and heat from peripheral electric/electronic components such as the light source driving circuit board 30, which supplies power to the light sources 12, when the backlight device 1 according to the preferred embodiment is driven.

As shown in FIG. 2A, the lower surface of the lens sheet 18 is entirely in contact with the upper surface of the first diffusion sheet 16 when a bend is yet to occur in the optical sheets 14, 16, 18, 20. Accordingly, the lens sheet 18 cannot bend downward and thus bends upward as shown in FIG. 2B. Because the space 24 for expansion is provided on the lens sheet 18, even if the lens sheet 18 bends significantly due to thermal expansion, the bend of the lens sheet 18 is accommodated by the space 24 for expansion. Thus, the lens sheet 18 does not bend downward.

Provided with a configuration such that the lens sheet 18, which is most prone to bend among the optical sheets 14, 16, 18, 20, is easy to bend toward one side but difficult to bend toward the other side, the lens sheet 18 expands toward the side of the space 24 for expansion, i.e., toward the side where the spacer 26 is provided. Accordingly, the lens sheet 18 can be prevented from being sandwiched between the upper surface of the diffusion sheet 16 and the lower surface of the second diffusion sheet 20 and accordingly from undulating.

Because the diffusion plate 14 is thicker than the first and second diffusion sheets 16, 20 and the lens sheet 18, it does not bend as significantly as the lens sheet 18 bends even when it is expanded by a temperature rise caused by heat from the light sources 12. Additionally, because the lower surface of the first diffusion sheet 16 is entirely in contact with the upper surface of the diffusion plate 14, the first diffusion sheet 16 cannot bend downward and thus bends upward. Because the space 24 for expansion is provided under the second diffusion sheet 20, while the frame 28 which is in contact with the edge portion of the second diffusion sheet 20 is provided on the second diffusion sheet 20, the central portion of the second diffusion sheet 20 is capable of altering its shape freely both upward and downward. However, the second diffusion sheet 20 is relatively less prone to bend and thus does not undulate.

When an optical sheet such as the lens sheet 18 bends only toward one side as described above, luminance nonuniformity or other problems of light emitted by the backlight device 1 is less likely to occur compared with when the optical sheet undulates. Accordingly, when the back surface of a display panel is illuminated by the backlight device 1, luminance nonuniformity and/or shades do not easily occur on the screen of the display panel. Even if any luminance nonuniformity and/or shades occur, it is difficult to visually recognize them on the display panel screen if the optical sheet bends only toward one side, thereby preventing degradation of display quality.

The first and second diffusion sheets 16, 20, for example, have nondirectional optical properties of diffusing light being transmitted therethrough. Accordingly, even if the light emitting surfaces become nonflat due to a bend and/or a wrinkle of the first and second diffusion sheets 16, 20, luminance nonuniformity or shade is less likely to occur in the light emitted by the backlight device 1. Meanwhile, the lens sheet 18 has directional optical properties of converging light being transmitted therethrough to a predetermined region. Accordingly, if the light emitting surface becomes nonflat due to a bend and/or a wrinkle of the lens sheet 18, luminance nonuniformity occurs in the light emitted by the backlight device 1, thereby causing degradation of the display quality.

If the space 24 for expansion is provided as with the case of the backlight device 1, it is possible to accommodate a bend of an optical sheet and to maintain the optical sheet to be flat especially in the central portion. By providing an optical sheet having directional optical properties such as the lens sheet 18 as one of the optical sheets which are opposed to each other having the space 24 for expansion therebetween, it is possible to reduce luminance nonuniformity more effectively.

In addition, if the space 24 for expansion is provided by placing the spacers 26 on the edge portions of the optical sheets 14, 16, 18, 20, any bend and/or wrinkle which occur in the optical sheets tend to occur near the spacers 26, i.e., in the edge portions of the optical sheets. Accordingly, even if luminance nonuniformity and/or shades occur due to the bend in the edge portions of the optical sheets, it is difficult to visually recognize them, so that the display quality is not degraded.

Figure 4A:
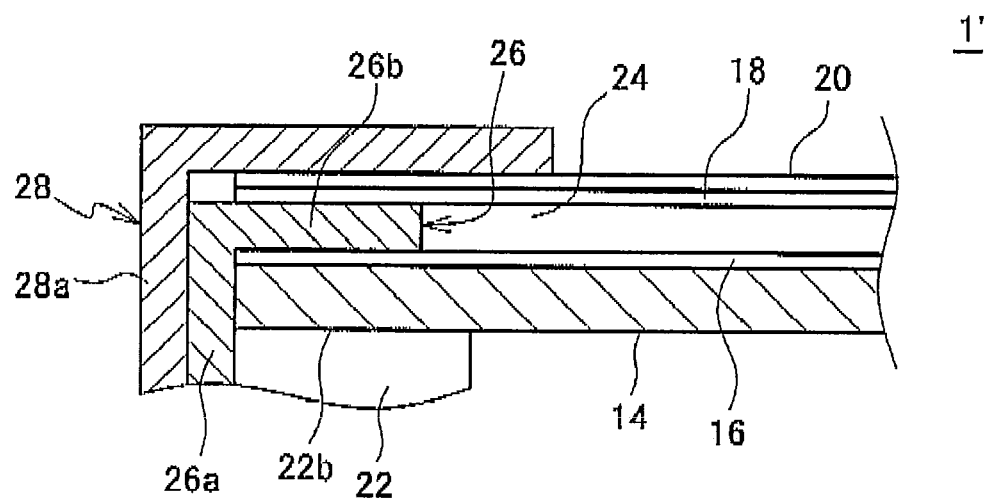
FIGS. 4A and 4B are views showing a first modified embodiment of the backlight device according to the preferred embodiment of the present invention.
Figure 4B:
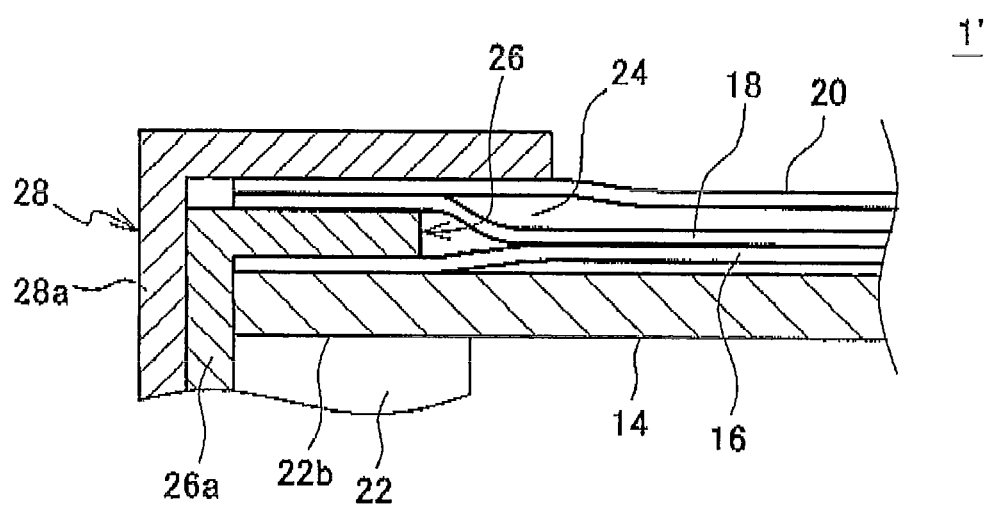

FIGS. 4A and 4B are views showing a first modified embodiment of the present invention. Constituents common to the backlight device according to the preferred embodiment of the present invention described above are assigned the same reference numerals and descriptions thereof are omitted, and different constituents only are described.

FIG. 4A is an enlarged sectional view showing the vicinity of edge of the optical sheets 14, 16, 18, 20 in a state where a backlight device 1' is assembled. The first diffusion sheet 16, the lens sheet 18, and the second diffusion sheet 20 are placed over the diffusion plate 14 (on the front side of the diffusion plate 14) which is placed on the support surface 22b of the side holder 22, and the spacer 26 is placed between the first diffusion sheet 16 and the lens sheet 18. The space 24 for expansion is thus provided between the first diffusion sheet 16 and the lens sheet 18. Accordingly, the space 24 for expansion is placed on one surface (the lower surface) of the lens sheet 18, and the second diffusion sheet 20 is provided on the other surface (the upper surface).

FIG. 4B is an enlarged sectional view showing the optical sheets 14, 16, 18, 20 which are heated by heat from the light sources 12 and heat from peripheral electric/electronic components such as the light source driving circuit board 30, which supplies power to the light sources 12, when the backlight device 1' is driven.

As shown in FIG. 4A, the space 24 for expansion is provided under the lower surface of the lens sheet 18 when a bend is yet to occur in the optical sheets 14, 16, 18, 20. Accordingly, the lens sheet 18 can freely alter its shape toward the lower side and thus bends downward. If the lens sheet 18 thus bends downward, the bend is accommodated by the space 24 for expansion, preventing the lens sheet 18 from undulating.

When the optical sheets 14, 16, 18, 20 including the lens sheet 18 bend only toward one side as described above, luminance nonuniformity or other problems of light emitted by the backlight device 1' is less likely to occur compared with when the optical sheet undulates. Accordingly, the above configuration achieves the same beneficial effects as the preferred embodiment of the present invention described above.

In addition, if the space 24 for expansion is provided by placing the spacers 26 on the edge portions of the optical sheet 18, any bend and/or wrinkle which occur in the lens sheet 18 tend to occur near the spacers 26, i.e., in the edge portions of the lens sheet 18. Accordingly, even if luminance nonuniformity and/or shades occur due to the bend of the lens sheet 18, it is difficult to visually perceive them.

FIGS. 5A to 6B are views showing a second modified embodiment of the present invention. Constituents common to the backlight device 1 according to the preferred embodiment of the present invention described above are assigned the same reference numerals and descriptions thereof are omitted, and different constituents only are described.

Figure 5A:
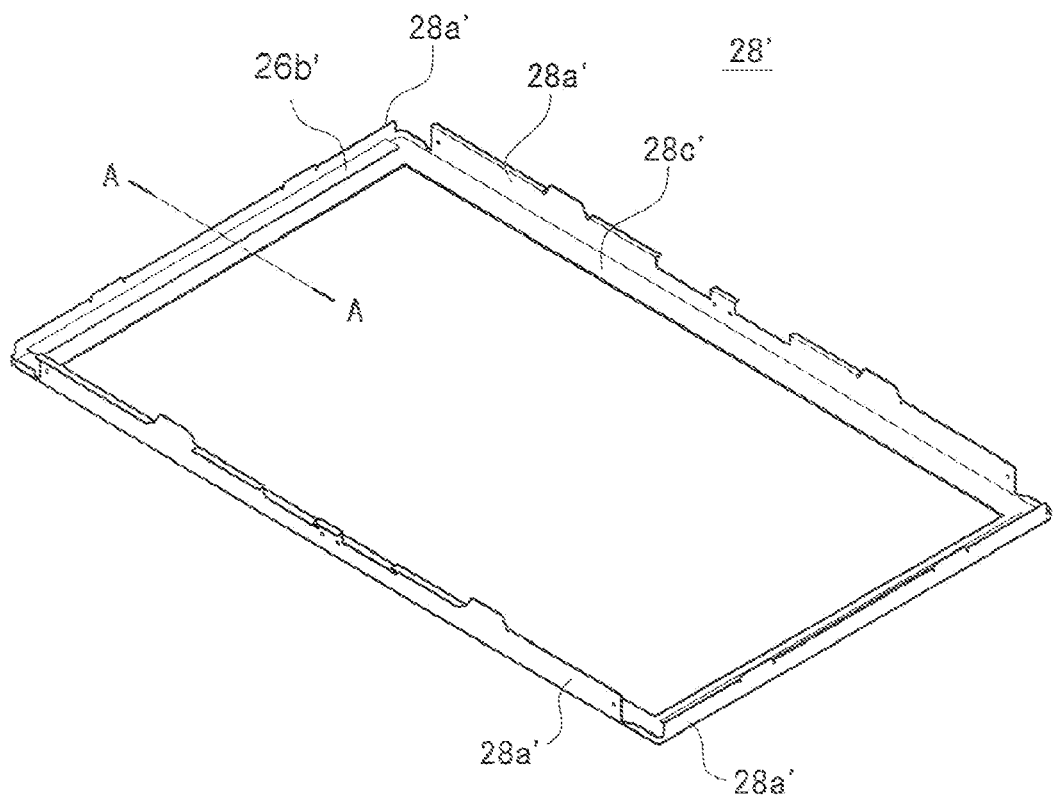
FIGS. 5A and 5B are perspective views showing a frame to be used in a backlight device according to a second modified embodiment of the present invention.
Figure 5B:
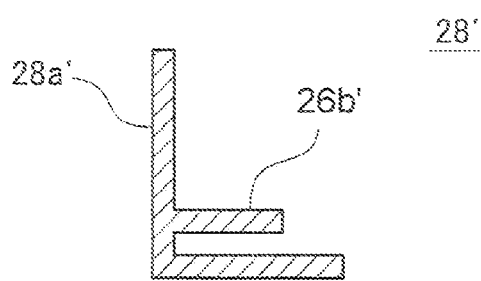

A backlight device 1" includes a frame 28' in which a spacer 26b' is integrated. FIG. 5A is a perspective view showing the frame 28' from the back side, and FIG. 5B is a sectional view thereof. The frame 28' includes a frame portion 28c' which is in the shape of a square with an opening and side wall portions 28a' extending from the outer edge of the frame portion 28c' toward the back side. On both the shorter sides of the frame 28', spacers 26b' which are thin plates in a strip shape protrude from the inside surface of the side wall portions 28a'. The spacers 26b' are provided over the entire length of the shorter sides of the frame 28'.

Figure 6A:
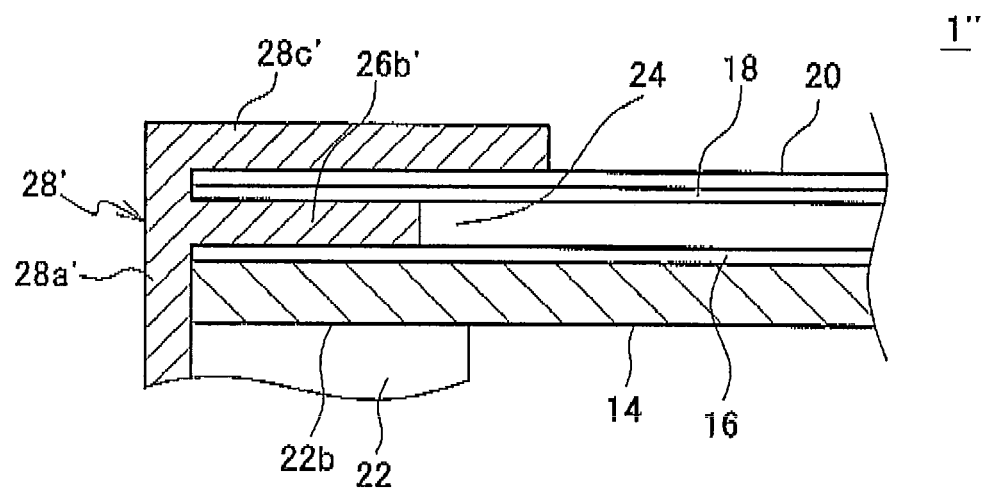
FIGS. 6A and 6B are views showing the second modified embodiment of the backlight device according to the preferred embodiment of the present invention.

FIG. 6A is an enlarged sectional view showing the vicinity of edge of the optical sheets 14, 16, 18, 20 in a state where the backlight device 1" is assembled. The first diffusion sheet 16 is placed on the diffusion plate 14 (on the front side of the diffusion plate 14) which is placed on the support surface 22b• of the side holder 22, and the lens sheet 18 and the second diffusion sheet 20 are placed over the first diffusion sheet 16 having the spacer 26b' therebetween. The space 24 for expansion is thus provided between the first diffusion sheet 16 and the lens sheet 18. Accordingly, the space 24 for expansion is placed on one surface (the lower surface) of the lens sheet 18, and the second diffusion sheet 20 is provided on the other surface (the upper surface).

The optical sheets 14, 16, 18, 20 are placed on the front side of the optical sources 12 by inserting the ends of the lens sheet 18 and the second diffusion sheet 20 between the frame portion 28c' of the frame 28' and the spacers 26b' in advance, stacking the first diffusion sheet 16 on the diffusion plate 14 placed on the support surfaces 10b and 22b of the chassis 10 and the side holders 22, and attaching the frame 28' to the chassis 10.

Figure 6B:
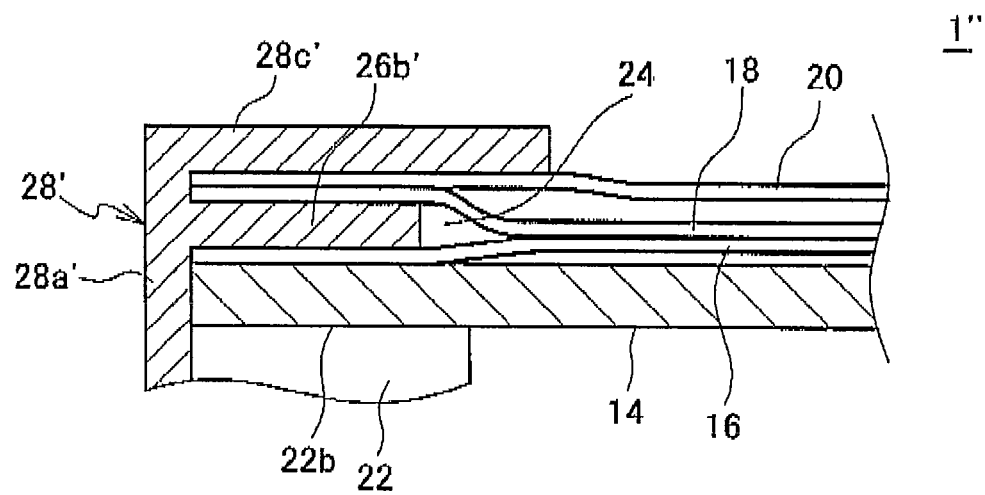

FIG. 6B is an enlarged sectional view showing the optical sheets 14, 16, 18, 20 which are heated by heat from the light sources 12 and heat from peripheral electric/electronic components such as the light source driving circuit board 30, which supplies power to the light sources 12, when the backlight device 1" is driven.

As shown in FIG. 6A, the space 24 for expansion is provided under the lower surface of the lens sheet 18 when a bend is yet to occur in the optical sheets 14, 16, 18, 20. Accordingly, the lens sheet 18 can freely alter its shape toward the lower side and thus bends downward. If the lens sheet 18 bends downward, the bend is accommodated by the space 24 for expansion, preventing the lens sheet 18 from undulating.

When the lens sheet 18 bends only toward one side as described above, luminance nonuniformity or other problems of light emitted by the backlight device 1" is less likely to occur compared with when the lens sheet 18 undulates. Accordingly, the above configuration achieves the same beneficial effects as the preferred embodiment of the present invention described above.

In addition, if the space 24 for expansion is provided by placing the spacers 26*b*' on the edge portions of the lens sheet 18, any bend and/or wrinkle which occur in the lens sheet 18 tend to occur near the spacers 26*b*', i.e., in the edge portions of the lens sheet 18. Accordingly, even if luminance nonuniformity and/or shades occur due to the bend of the lens sheet 18, it is difficult to visually perceive them.

Figure 7A:
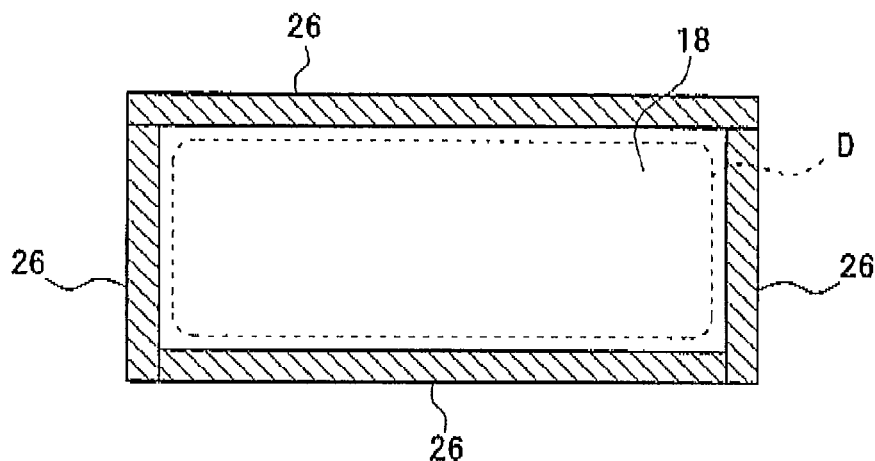
FIGS. 7A to 7C are schematic views showing states where spacers are each provided on the four sides of an optical sheet.
Figure 7B:
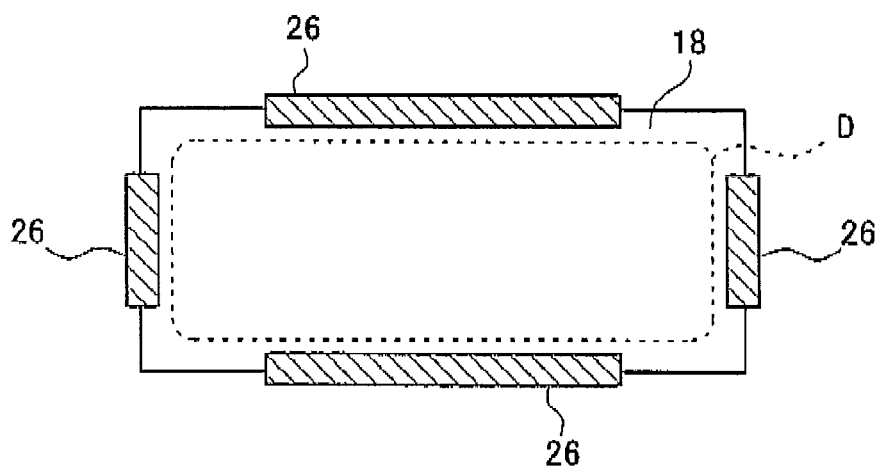
Figure 7C:
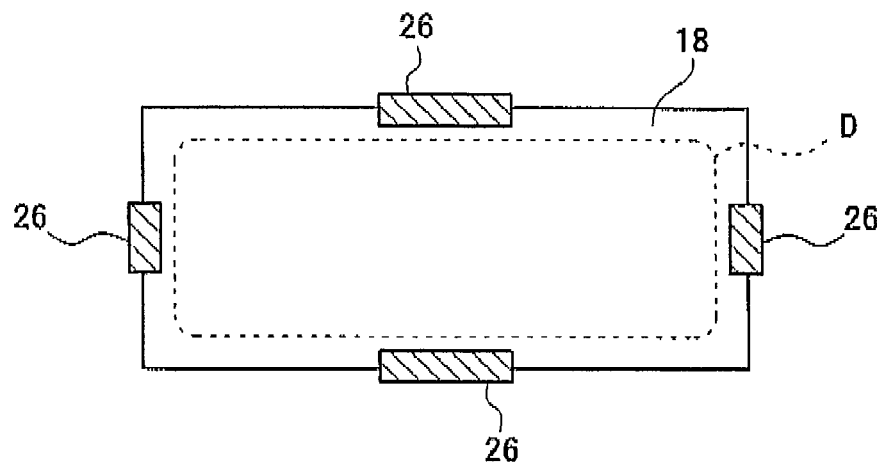

Next, a description on the placement of the spacers 26 is provided referring to FIGS. 7A to 9C. FIGS. 7A to 9C are schematic views showing positional relationships between the lens sheet 18 and the spacers 26. As shown in FIG. 7A, the spacers 26 may be placed over the entire longer and shorter sides of the lens sheet 18, i.e., over the entire edge portion of the lens sheet 18. As shown in FIG. 7B, the spacers 26 may be placed on the longer and shorter sides of the lens sheet 18 but excluding the four corners. As shown in FIG. 7C, the spacers 26 may be placed only in the vicinities of the middles of the longer and shorter sides of the lens sheet 18.

The region D indicated by dotted lines in FIGS. 7A to 9C is a region corresponding to the opening of the frame 28. If the spacers 26 are provided outside this region D, any luminance nonuniformity or other problems caused by a bend and/or a wrinkle of the lens sheet 18 is difficult to visually perceive.

Figure 8A:
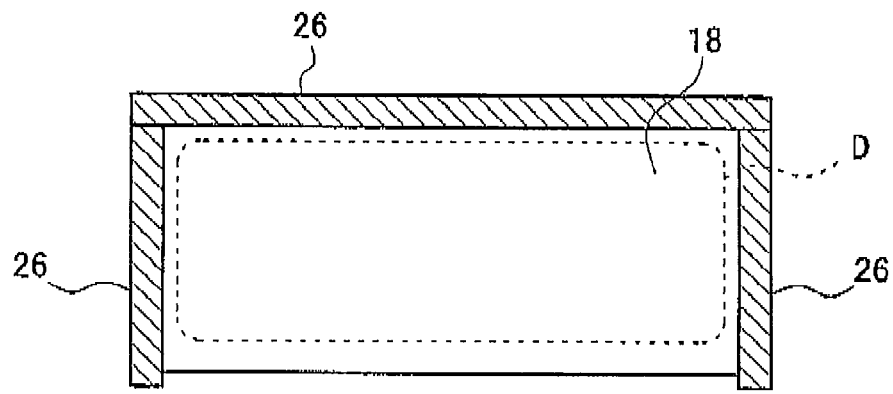
FIGS. 8A to 8C are schematic views showing states where spacers are each provided on three sides of an optical sheet.
Figure 8B:
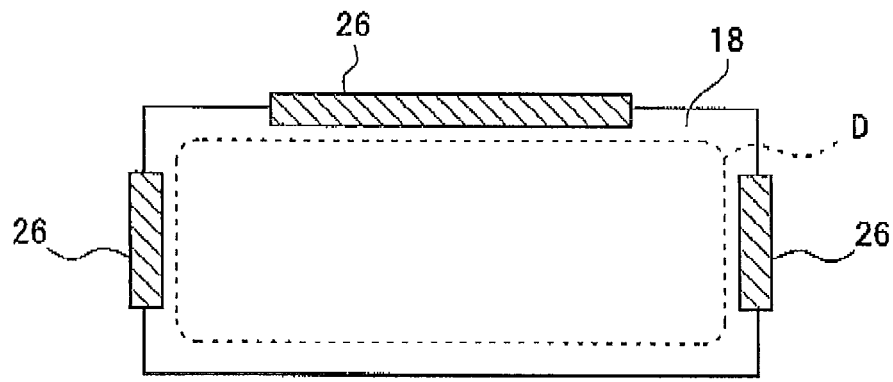
Figure 8C:
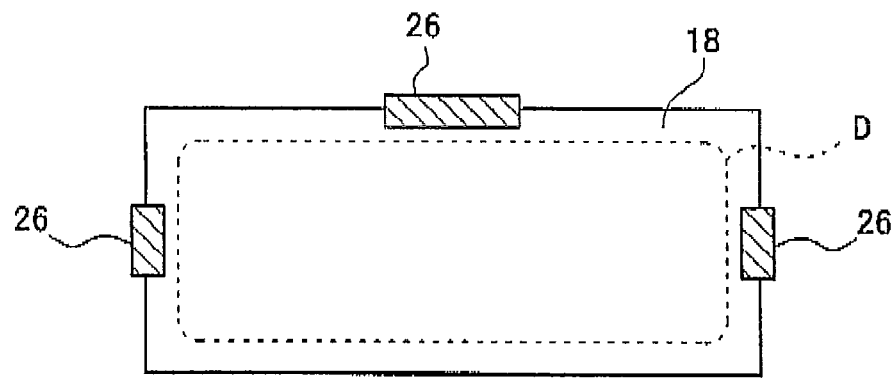

Alternatively, the spacers 26 may be provided only on the three sides excluding the side which is located on the bottom when the backlight device 1 (1', 1") is in use, as shown in FIGS. 8A to 8C. FIG. 8A is a view showing an example where the spacers 26 are placed over the entire lengths of the three sides excluding the side which is located on the bottom when the backlight device is in use. The side located on the bottom when the backlight device is in use is pulled downward by its own weight when the lens sheet 18 is expanded by heat and is thus relatively less prone to bend. Accordingly, the spacers 26 may not be necessary on this side. FIG. 8B is a view showing an example where the spacers 26 are placed on the three sides excluding the side which is located on the bottom when the backlight device is in use, the length of the spacers 26 being made slightly shorter than the respective sides. FIG. 8C is a view showing an example where the spacers 26 are placed only in the vicinities of the middles of the three sides excluding the side which is located on the bottom when the backlight device is in use.

Figure 9A:
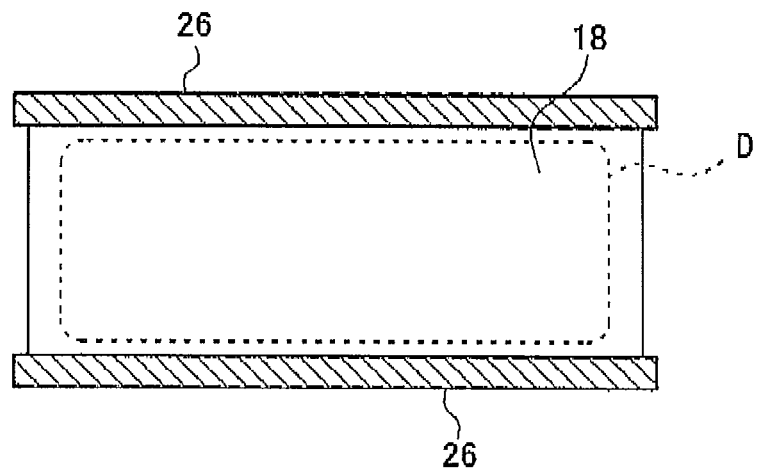
FIGS. 9A to 9C are schematic views showing states where spacers are each provided on two sides of an optical sheet.
Figure 9B:
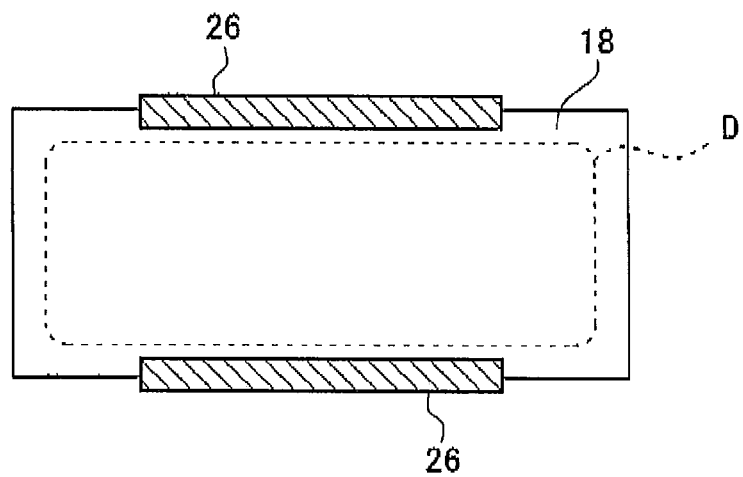
Figure 9C:
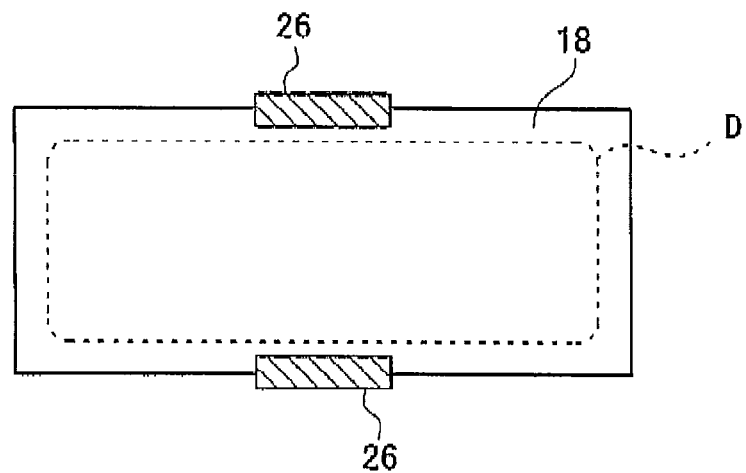

Still alternatively, the spacers 26 may be placed only on the longer sides of the lens sheet 18 as shown in FIGS. 9A to 9C. FIG. 9A is a view showing an example where the spacers 26 are placed over the entire longer sides of the lens sheet 18. FIG. 9B is a view showing an example where the spacers 26 the length of which is made slightly shorter than the longer sides of the lens sheet 18 are placed. FIG. 9C is a view showing an example where the spacers 26 are placed only in the vicinities of the middles of the longer sides of the lens sheet 18.

As described above, the positions of the spacers 26 can be adjusted in accordance with the characteristics of the optical sheet such as the size, shape, and type, and it is possible to select appropriate positions in order to reduce occurrence of a bend and/or wrinkle.

Figure 10:
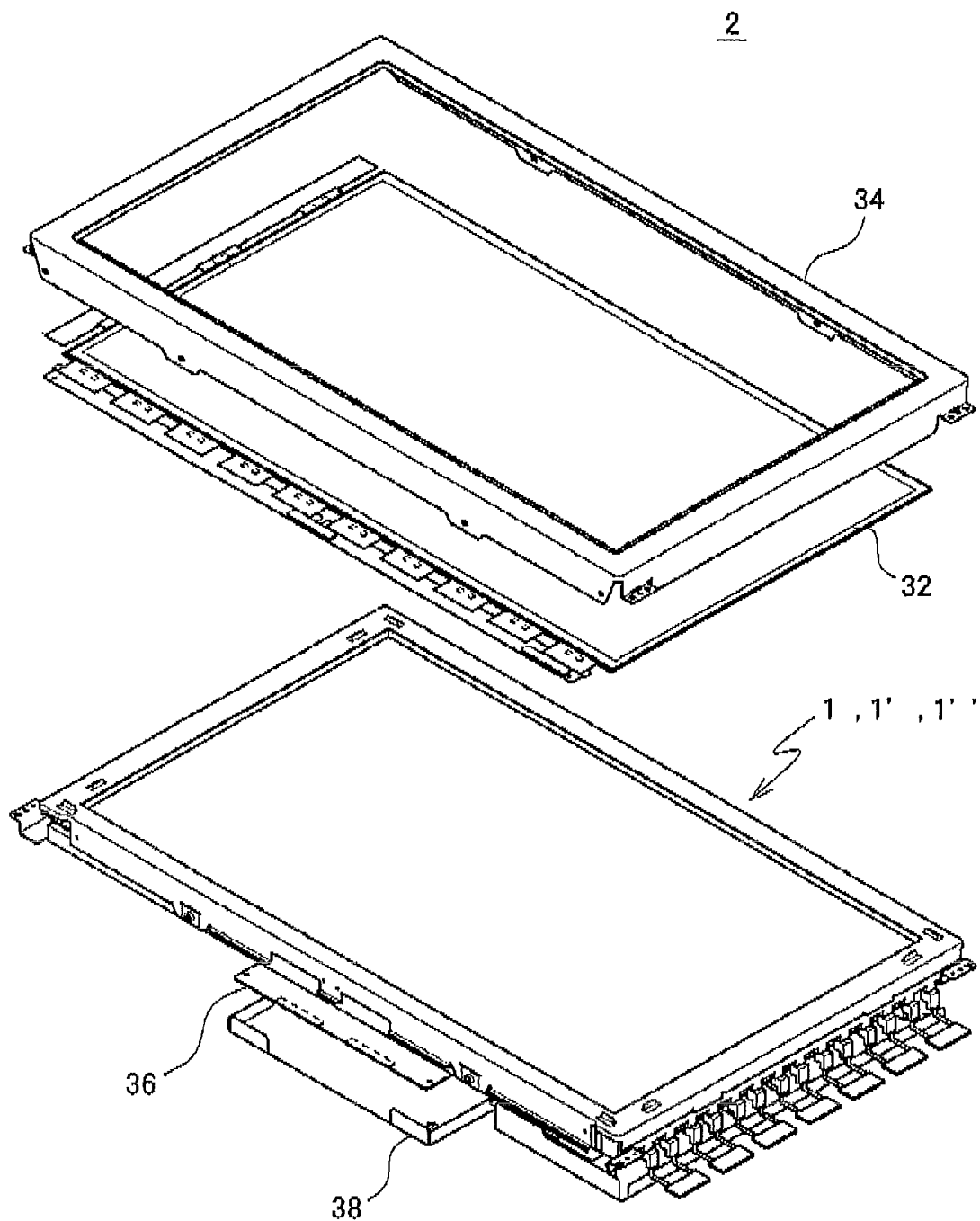
FIG. 10 is an exploded perspective view showing the configuration of a display device according to a preferred embodiment of the present invention The FIG. 11 is an exploded perspective view schematically showing the configuration of a television receiver having the display device according to the preferred embodiment of the present invention.

Next, a description on a display device 2 according to a preferred embodiment of the present invention is provided. FIG. 10 is an exploded perspective view showing the configuration of the display device 2 according to the preferred embodiment of the present invention.

As shown in FIG. 10, the display device 2 according to the preferred embodiment of the present invention includes the backlight device 1 (1', 1"), a display panel 32, a bezel 34, a control circuit board 36, and a control circuit board cover 38.

Various kinds of known translucent display panels may be used for the display panel 32. For example, a liquid crystal display panel of an active matrix type may be used. The bezel 34 has functions such as supporting and/or protecting the display panel 32. FIG. 10 shows that the bezel 34 is substantially in the shape of a square having an opening. The control circuit board 36 incorporates electronic/electric circuits which generate control signals for driving the display panel 32 based on image signals inputted from the outside. The control circuit board cover 38 is a plate-shaped member which covers the control circuit board 36. The control circuit board cover 38 is preferably made of a metal plate material.

The display device 2 according to the preferred embodiment of the present invention is assembled as follows. The display panel 32 is placed on the front side of the frame 28 (28') of the backlight device 1 (1', 1"). On the back side of the chassis 10 of the backlight device 1 (1', 1"), the control circuit board 36 is placed. Then, a circuit board to be attached to the display panel 32 and the control circuit board 36 are connected to allow transmission of various signals. In addition, the bezel 34 is attached to the front side of the display panel 32, and the control circuit board cover 38 is placed so as to cover the control circuit board 36.

The display device 2 makes an image displayed visible on the front side of the display panel 32 when light emitted by the backlight device 1 (1', 1") passes through the display panel 32. Additionally, a bend and/or a wrinkle of the optical sheets 14, 16, 18, 20 are accommodated by the space 24 for expansion so that high quality display without luminance nonuniformity or shade is achieved.

Figure 11:
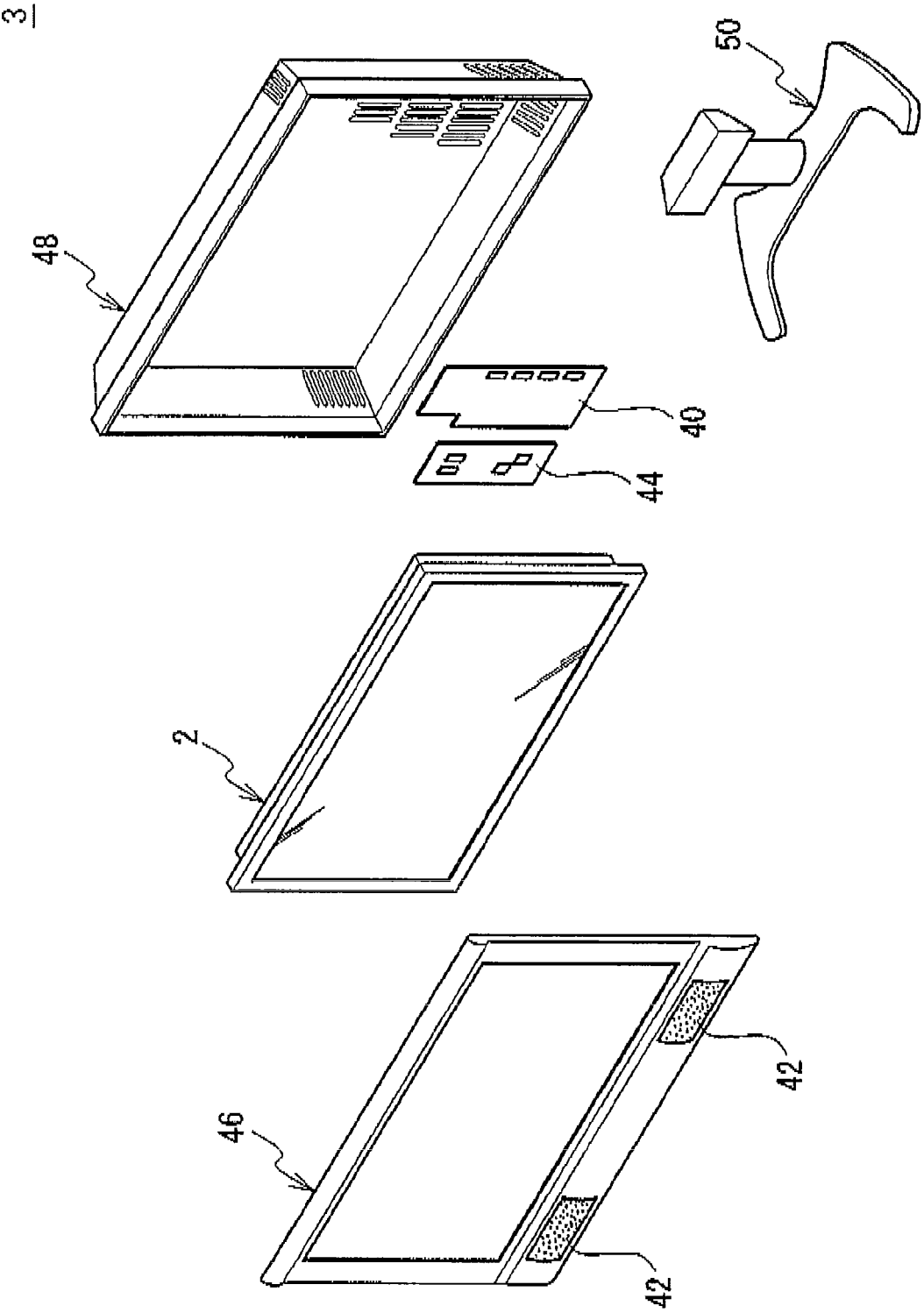

Next, a brief description on a television receiver 3 according to a preferred embodiment of the present invention having the display device 2 is provided. The FIG. 11 is an exploded perspective view schematically showing the configuration of the television receiver 3 having the display device 2 according to the above-described preferred embodiment of the present invention. The television receiver 3 includes a tuner 40, the display device 2, loudspeaker mechanisms 42, a power source 44, a cabinet 46, 48 and a supporting member 50.

The tuner 40 produces image signals and sound signals of a given channel based on received airwaves and signals inputted from the outside. As the tuner 40, a conventional tuner such as a terrestrial tuner (an analogue/digital terrestrial tuner), a BS tuner, and a CS tuner for example can be used.

The display device 2 displays images based on image signals produced by the tuner 40. The display device according to the above-described preferred embodiment of the present invention can be used as the display device 2. The loudspeaker mechanisms 42 produce sound based on sound signals generated by the tuner 40. As the loudspeaker mechanisms 42, various known loudspeaker mechanisms such as a general loudspeaker can be used. The power source 44 supplies power to the tuner 40, the display device 2, the loudspeaker mechanisms 72, and other components.

The tuner 40, the display device 2, the loudspeaker mechanisms 42, and the power source 44 are housed in the cabinet (the cabinet shown in FIG. 11 includes a front-side cabinet 46 and a back-side cabinet 48) and are supported by the supporting member 50. The prevent invention is not limited to such a configuration, and the tuner 40, the loudspeaker mechanisms 42, and the power source 44 may be mounted on the display device 2.

The foregoing description of the preferred embodiments of the present invention has been presented for purposes of illustration and description. However, it is not intended to limit the present invention to the preferred embodiments described herein, and modifications and variations are possible as long as they do not deviate from the principles of the invention. For example, in the preferred embodiment of the present invention, the optical sheets are configured such that the lens sheet is provided between the first diffusion sheet and the second diffusion sheet; however, the present invention is not limited thereto, and optical sheets such as a prism sheet and/or a polarizing reflection sheet may be included. In addition, the number of the optical sheets is not limited to three, and any number of optical sheets greater or equal to three may be used. Further, the shape of the spacers 26 is not limited to the shape described in the above-described preferred embodiment of the present invention, and any configuration which can form a space for expansion on one surface of an optical sheet may be used.

What is claimed is:

1. A backlight device to be disposed behind a display panel, the backlight device comprising:
   a light source arranged to emit light; and
   a plurality of stacked optical sheets having different coefficients of thermal expansion, the optical sheets being arranged to control the properties of the light emitted by the light source;
   a holding member having a frame shape and disposed in front of the optical sheets, the holding member being arranged to hold the optical sheets;
   a spacer disposed in a space for expansion provided between the optical sheets held by the holding member, entirely or partly on an edge portion of the optical sheets, the space for expansion is arranged to accommodate a bend of the optical sheets which is caused by expansion of the optical sheets having the different coefficients of thermal expansion due to heat from the light source.

2. The backlight device according to claim 1, wherein the plurality of optical sheets comprise:
   a pair of diffusion sheets; and
   a lens sheet provided between the diffusion sheets,
   wherein the space for expansion is disposed between one of the diffusion sheets and the lens sheet.

3. A display device comprising the backlight device according to claim 1 and a display panel placed on a front side of the backlight device.

4. The display device according to claim 3, wherein the display panel comprises a liquid crystal display panel comprising a pair of transparent substrates and a liquid crystal sandwiched between the transparent substrates.

5. A television receiver comprising a receiving mechanism for receiving an airwave and a display mechanism for displaying a content of the airwave received by the receiving mechanism, wherein the display mechanism comprises the display device according to claim 3.

6. A backlight device to be disposed behind a display panel, the backlight device comprising:
   a light source arranged to emit light; and
   a plurality of stacked optical sheets having different coefficients of thermal expansion, the optical sheets being arranged to control the properties of the light emitted by the light source, and including a diffusion sheet at an upper outer surface of the stacked optical sheets;
   a holding member having a frame shape and disposed in front of the diffusion sheet, the holding member being arranged to hold the optical sheets;
   a spacer disposed in a space for expansion provided between the diffusion sheet and a remainder of the stacked optical sheets held by the holding member, entirely or partly on an edge portion of the optical sheets, the space for expansion is arranged to accommodate a bend of the optical sheets which is caused by expansion of the optical sheets having the different coefficients of thermal expansion due to heat from the light source.

* * * * *